(12) United States Patent
Khuat (10) Patent No.: US 6,396,922 B1
(45) Date of Patent: May 28, 2002

(54) TELECOMMUNICATIONS TERMINAL CARD (75) Inventor: Chuck D. Khuat, Plano, TX (US)

(73) Assignee: Alcatel USA Sourcing, L.P., Plano, TX (US)

( * ) Notice: Subject to any disclaimer, the term of this patent is extended or adjusted under 35 U.S.C. 154(b) by 0 days.

(21) Appl. No.: 09/001,065

(22) Filed: Dec. 30, 1997

(51) Int. Cl.[7] .............................. H04M 1/00; H04M 9/00
(52) U.S. Cl. .................... 379/394; 379/398; 379/399.01
(58) Field of Search ................................. 379/394, 398, 379/399.01, 333; 370/420, 419, 421, 467

(56) References Cited

U.S. PATENT DOCUMENTS

| 4,402,074 A | | 8/1983 | Cupuis et al. |
| 4,868,863 A | * | 9/1989 | Hartley et al. ............ 379/93.29 |
| 4,993,019 A | | 2/1991 | Cole et al. |
| 5,258,713 A | | 11/1993 | Rosch et al. |
| 5,267,309 A | | 11/1993 | Sanders et al. |
| 5,305,315 A | | 4/1994 | Lee |
| 5,500,894 A | | 3/1996 | Hershbarger |
| 5,506,868 A | * | 4/1996 | Cox et al. ................. 379/93.29 |
| 5,583,934 A | | 12/1996 | Zhou |
| 5,675,643 A | | 10/1997 | Byers |
| 6,047,061 A | * | 4/2000 | Cornes et al. .............. 379/333 |
| 6,081,586 A | * | 6/2000 | Rahamim et al. ......... 379/93.29 |
| 6,091,806 A | * | 7/2000 | Rasmus et al. ........... 379/93.29 |
| 6,198,817 B1 | * | 3/2001 | Derby et al. ................ 379/394 |

FOREIGN PATENT DOCUMENTS

| EP | 0 503 528 | 9/1992 |
| EP | 0 681 388 | 11/1995 |

* cited by examiner

Primary Examiner—Stella Woo
(74) Attorney, Agent, or Firm—Jackson Walker LLP; Richard A. Mysliwiec; V. Lawrence Sewell (57) ABSTRACT A telecommunications card for use in a telecommunications terminal. The telecommunications card includes at least one programmable channel capable of satisfying different telecommunications standards based on configuration input. The different telecommunications standards, such as impedance, gain, and transhybrid impedance, relate to different countries. The card may include circuit blocks that provide different circuit paths that correspond to different telecommunications standards. The card may include a programmable codec for impedance and/or transhybrid balance.

24 Claims, 8 Drawing Sheets

FIG. 1

| Type | Elements | Network |
|---|---|---|
| 1 | Single series Resistor | —R1⌇— |
| 2 | Series Resistor/Capacitor | —R1⌇—C╫— |
| 3 | Resistor in series with a parallel Resistor/Capacitor | —R1⌇—[R2⌇ ∥ C╫]— |
| 4 | Resistor in parallel with a series Resistor/Capacitor | [R1⌇ ∥ R2⌇—C╫] |

FIG. 2

| Target Line Specification | | Desired/Nominal Impedance ($Z_D$) | | | | Line/Exchange/Balance Impedance ($Z_L$) | | | |
|---|---|---|---|---|---|---|---|---|---|
| Country | (Options) | Type | R1 (Ω) | R2 (Ω) | C (nF) | Type | R1 (Ω) | R2 (Ω) | C (nF) |
| Australia | | 3 | 220 | 820 | 120 | 3 | 220 | 820 | 120 |
| Austria | | 3 | 220 | 820 | 115 | 3 | 220 | 1200 | 150 |
| Belgium | | 3 | 150 | 830 | 72 | 3 | 150 | 830 | 72 |
| Brazil | | 1 | 900 | | | 1 | 900 | | |
| China | (PRC) | 1 | 600 | | | 1 | 600 | | |
| Finland | (Case 1) | 3 | 270 | 910 | 120 | 3 | 270 | 910 | 120 |
| Finland | (Case 2) | 1 | 600 | | | 3 | 345 | 871 | 120 |
| France | | 3 | 215 | 1000 | 137 | 1 | 600 | | |
| Germany | | 3 | 220 | 820 | 115 | 3 | 220 | 820 | 115* |
| India | | 1 | 600 | | | 1 | 600 | | |
| Italy | | 3 | 400 | 700 | 200 | 3 | 400 | 700 | 200 |
| Japan | | 2 | 600 | | 1000 | 2 | 600 | | 1000 |
| Korea | | 1 | 600 | | | 1 | 600 | | |
| Switzerland | | 3 | 220 | 820 | 115 | 3 | 220 | 820 | 115* |
| UK | | 3 | 300 | 1000 | 220 | 3 | 370 | 620 | 310 |
| USA | Non-Loaded | 2 | 900 | | 2160 | 4 | 800 | 100 | 50 |
| USA | Loaded | 2 | 900 | | 2160 | 4 | 1650 | 100 | 5 |
| USA | Special Service | 2 | 900 | | 2160 | 2 | 900 | | 2160 |

TELECOMMUNICATIONS TERMINAL CARD

BACKGROUND

This invention relates to telecommunications terminal cards.

Telecommunications terminals connect subscriber lines, such as POTS (Plain Old Telephone Service) and ISDN (Integrated Services Digital Network) lines, to telecommunications exchanges and other telecommunications equipment. A terminal contains channel unit card slots that accept channel unit cards. Different types of channel unit cards service different types of subscriber lines (e.g. POTS or ISDN). Channel unit cards convert analog and digital signals from subscriber lines into formatted digital data signals. The terminal constructs a multiplexed signal from several channel unit cards'data signals for transmission to remote telecommunications equipment. The terminal also demultiplexes signals received from remote telecommunications equipment to deliver formatted digital data back to the channel unit cards. Channel unit cards convert the formatted digital data into a form suitable for transmission over subscriber lines.

Two telecommunications terminals can be connected "back to back" to form a digital loop carrier (DLC) network. A DLC network typically includes a remote terminal (RT) placed near a business or residence and a central office terminal (CT) placed in a central exchange connected to a telecommunications switch. The RT and CT communicate over a single line carrying multiplexed signals. This configuration connects subscribers to the telecommunications switch via the channel unit cards.

Channel unit cards handling subscriber lines must conform to telecommunications standards in the country in which the telecommunications terminal is deployed. While some countries use the same standards, for example, China, India, Korea, and Russia all require the same level of subscriber line impedance, many telecommunications standards differ. These standards govern transmission signal strength (e.g. Germany's telephones generate 0 db signals while China's telephones generate –7 db signals), subscriber line impedance, and other telecommunications features. Additionally, each card provides transhybrid balance that cancels echoes in line. Transhybrid balance prevents the channel unit card from echoing a signal back to its sender.

DSC™ Communications Corp. sells telecommunications terminals for use in different countries. DSC™ manufactures different dedicated channel unit cards for the different telecommunications standards.

SUMMARY

In general, in one aspect, a telecommunications card for use in a telecommunications terminal includes a subscriber line connection, a telecommunications terminal connection, and at least one programmable channel that carries signals between the subscriber line and the terminal. The channel can be programmed by configuration input to satisfy different telecommunications standards relating to subscriber lines.

Embodiments of the telecommunications card may include the following. The telecommunications standards may related to different countries. The telecommunications standards may include subscriber line impedance, gain, or transhybrid balance. The telecommunications card may be a POTS, RPOTS, CPOTS, ISDN, or other telecommunications card. The card channel may have circuit blocks that include selectable circuit paths that correspond to the different telecommunications standards and a standards selector that selects one of the paths based on configuration input. The circuit blocks may be "plug-ins" where each block supports a set of telecommunications standards. The configuration input may be from sources that include dip switches or software messages. The circuit paths in the circuit blocks may terminate in relays controlled by the standards selector. The card channel may include a programmable codec that provides impedance and/or transhybrid balance. The card channel may also include an external network that, provides a base level of impedance. The external network may be interchangeable with other external networks that provide different base levels of impedance.

In general, in one aspect, a method of changing telecommunications standards for a telecommunications card includes receiving telecommunications standards selection information and modifying electrical characteristics of the telecommunications card based on the selection information.

Advantages may include one or more of the following.

A programmable telecommunications terminal card enables manufacturers to produce, stock, and ship a single card for a variety of countries with different telecommunications standards. Terminal administrators in these different countries can adapt a card to conform to the country's standards with minimal hardware changes.

Other features and advantages will become apparent from the following description, including the drawings and the claims.

DETAILED DESCRIPTION

Figure 1:
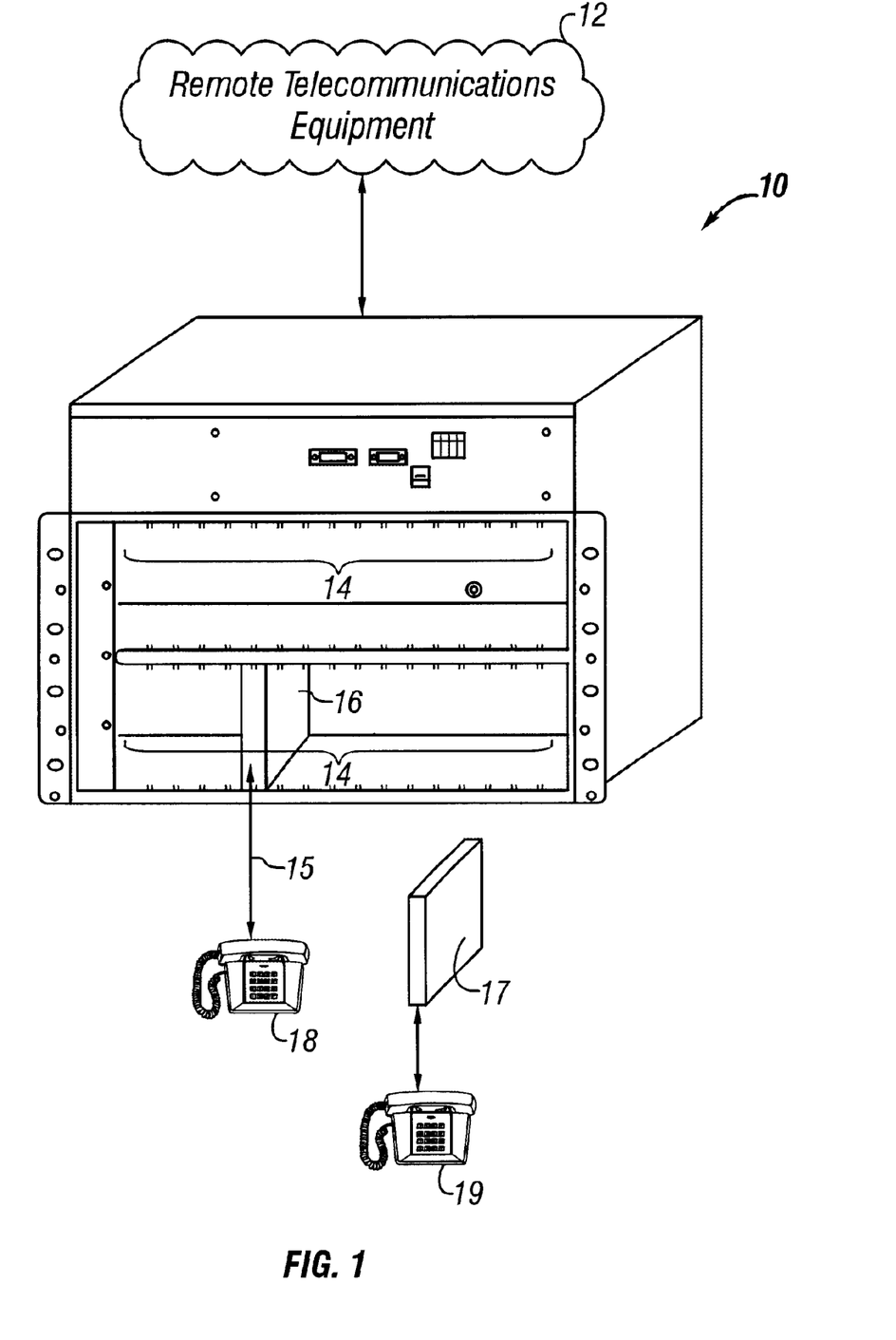
FIG. 1 is a perspective view of a telecommunications terminal.

As shown in FIG. 1, a telecommunications terminal 10 includes slots 14 that accept individual channel unit cards 16 and 17. (U.S. Ser. No. 08/970,183, filed Nov. 14, 1991, entitled "Telecommunications Terminal" describes a telecommunications terminal and is incorporated by reference). An inserted channel card 16 connects a subscribes line is from a subscriber device (e.g. a telephone) 18 to a terminal bus (not shown). The terminal bus carries data among inserted cards.

Figure 2:
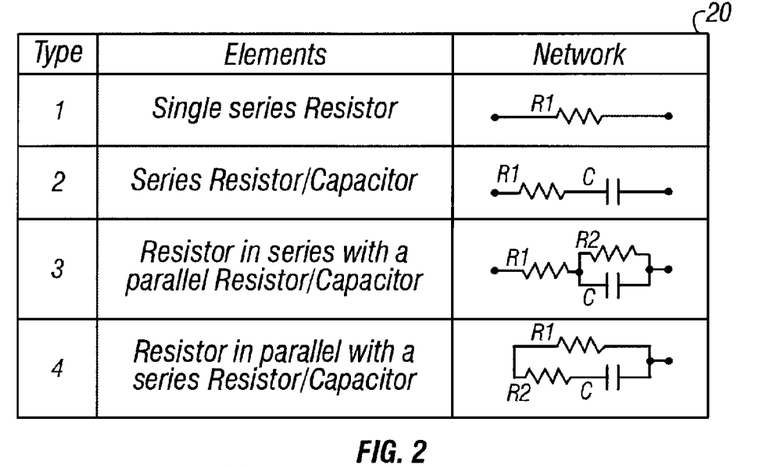
FIG. 2 is a table of impedance circuits.
Figure 3:
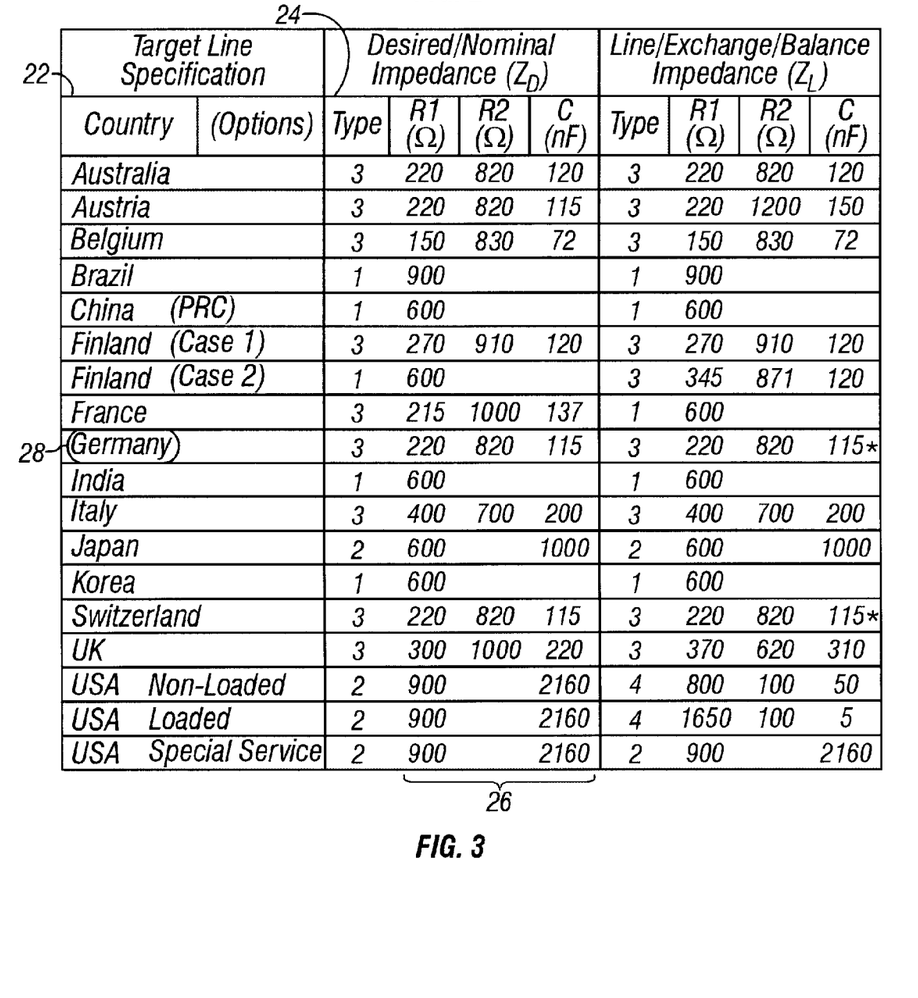
FIG. 3 is a table of impedance circuit values for different countries.

Referring to FIGS. 2 and 3, different countries require different subscriber line impedances. FIG. 2 identifies different impedance circuits 20. FIG. 3 identifies different countries 22, the corresponding type of impedance circuit 24 from FIG. 2, and circuit values 26 that provide the subscriber line impedance required for use in the listed country. For example, a German 28 POTS card provides subscriber line impedance by using impedance circuit 3 of FIG. 2 (i.e., resistor, R1, in series with a parallel resistor, R2, and capacitor, C) with values of 220 for R1, 820 for R2, and 115 nF for C.

Figure 4:
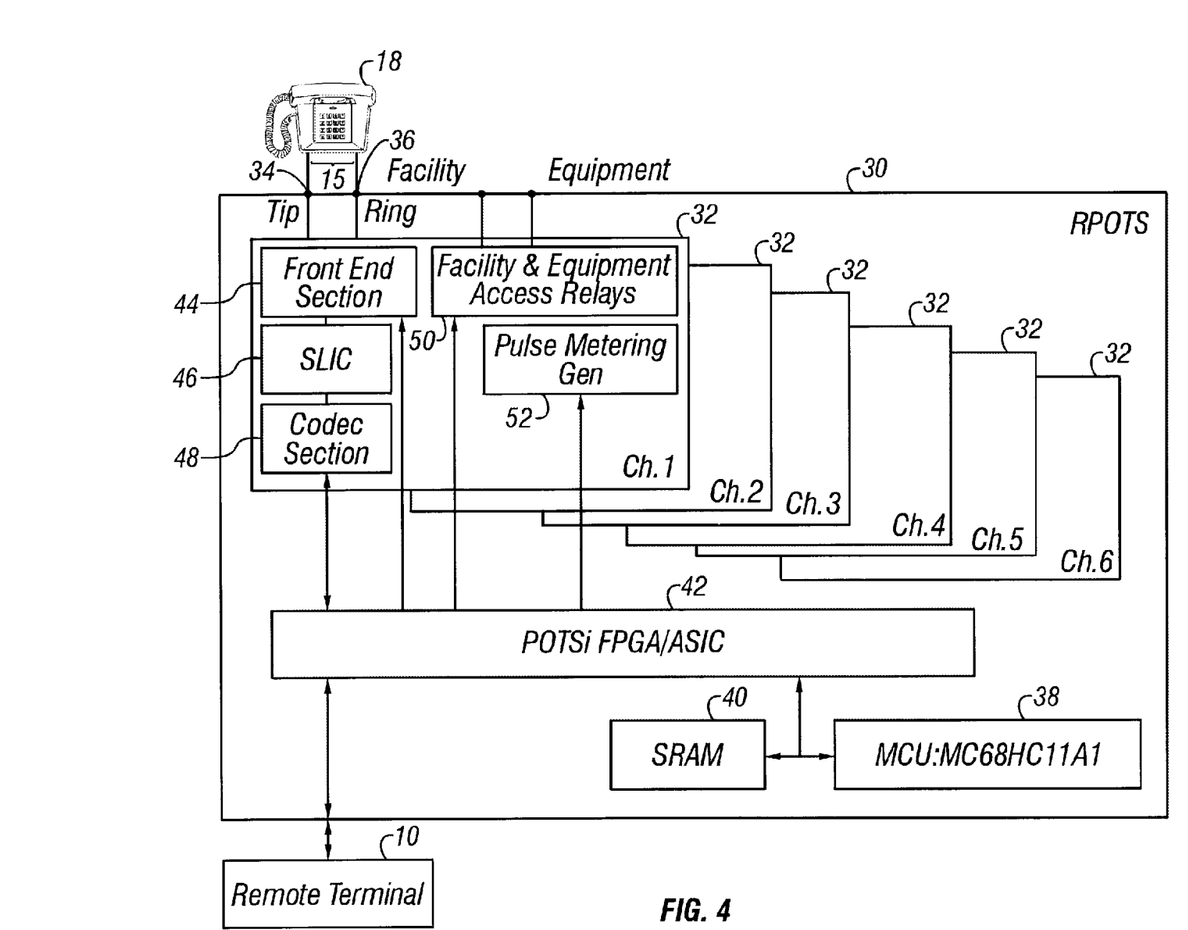
FIG. 4 is a block diagram of an RPOTS (remote terminal POTS) card.

Referring to FIG. 4, an RPOTS (remote terminal POTS) card 30 includes circuitry that enables a single card to satisfy more than one set of telecommunications standards. The card 30 includes a microprocessor 38, memory 40, and an ASIC (application-specific integrated circuit) 42 that collectively handle communication between the card 30 and the remote terminal 10. The card also includes six channels 32. Each channel provides service to a different subscriber line 15 and can include facility and equipment access relays 50, a pulse metering generator 52, a SLIC (subscriber line interface circuit) 46, a codec (encoder/decoder) section 48, and a front end section 44.

A channel's 30 front end section 44 receives telecommunications signals from a subscriber line 15 at Tip 34 and Ring 36 leads (the telephone equivalent of positive and negative leads). The front end section 44 provides ringing for the connected telephone and matches the polarity of the subscriber line with that of remote telecommunications equipment 12.

The SLIC section 46 receives the signal after it has been processed by the front end section 44 and prepares the signal for input into the codec section 48. The codec section 48 includes an analog-to-digital converter that digitizes the signal. The codec section 48 sends the digitized signal to the ASIC 42 for transmission to the terminal 10 and, ultimately, remote telecommunications equipment 12 (e.g. a DLC network central office terminal).

Signals received from central office terminal 12 follow the reverse series of steps. The ASIC 42 receives signals from the terminal 10 and sends them to the codec section 48 for digital-to-analog conversion. The SLIC section 46 and front end section 44 process the analog signal for transmission to the connected telephone 18 over the subscriber line 15.

Figure 5:
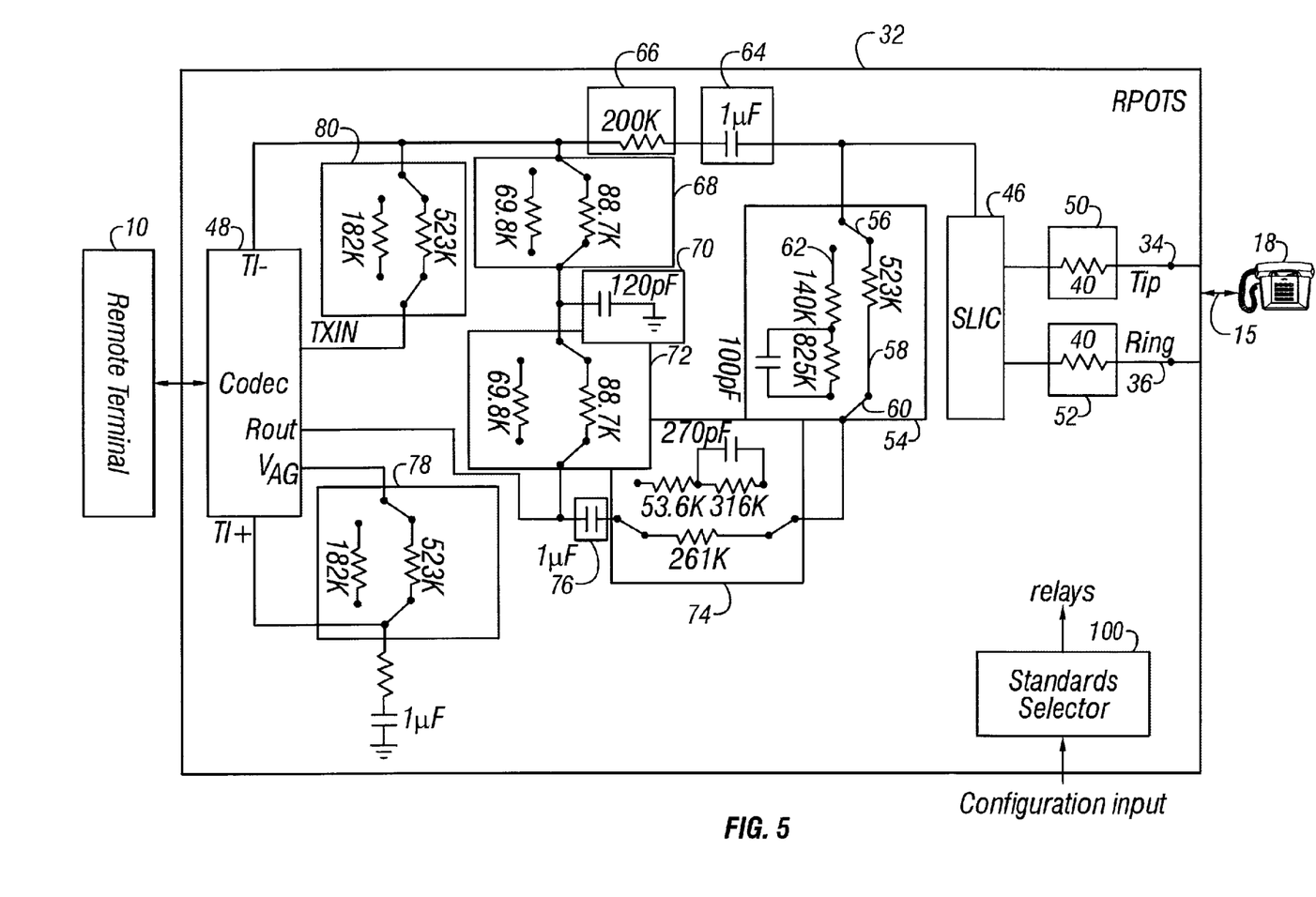
FIG. 5 is a schematic of a programmable RPOTS card.

Referring to FIG. 5, an RPOTS card channel 32 includes a codec 48, a SLIC 46, and circuit blocks for transmit gain 80 and 66, transmit blocking and DC offset 64, receive gain 74 and 54, receive blocking and DC offset 76, transhybrid balance 68, 70, 72, and subscriber line impedance 54, 50, 52.

Many circuit blocks include different circuit paths that satisfy different telecommunications standards. Each circuit path terminates in switches or other electronic devices, such as relays 56 and 60, that select a path for use. A standards selector 100 controls which circuit paths the relays enable. As shown, the standards selector 100 has set the channel's relays to satisfy China's telecommunications standards instead of Germany's. A telecommunications terminal administrator can quickly configure the card for a particular country by setting the standards selector 100 through dip switches or a configuration message or program instruction sent by a telecommunications terminal management system (not shown). For example, the standards selector 100 may use a 2-to-4 decoder that decodes input selection data such that input bits of "00", "01", "10", or "11" configure the channel for Germany, China, Austria, or the United States, respectively.

Figure 6:
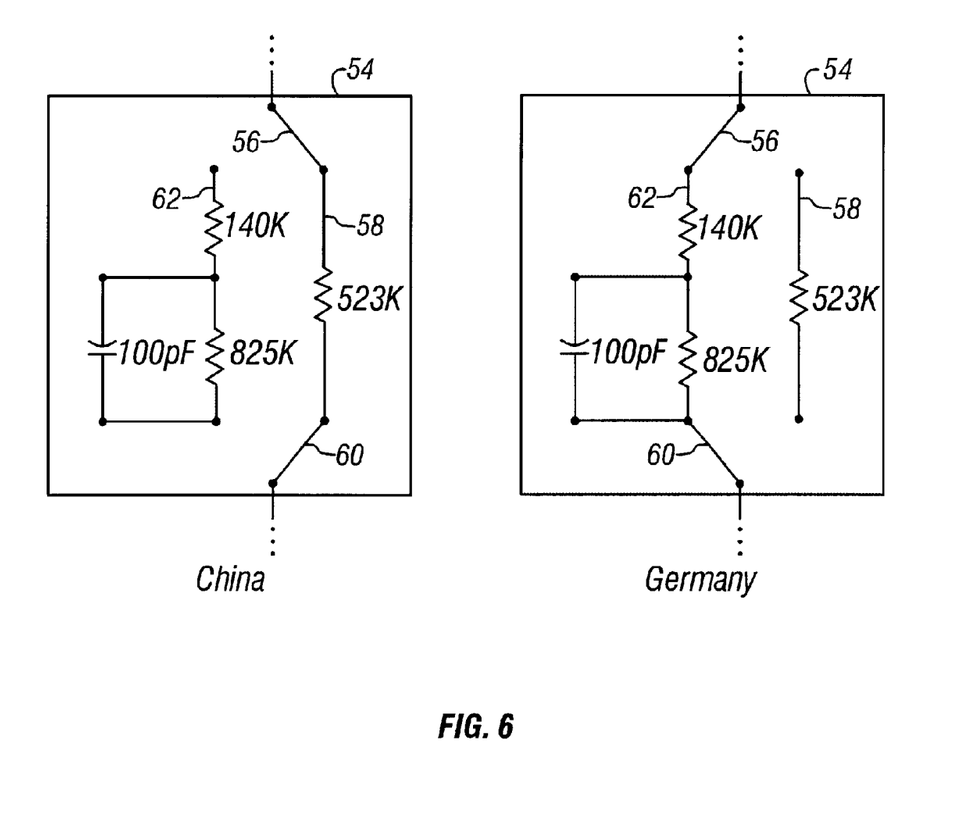
FIG. 6 is a schematic of a relay connecting different circuit paths.

Referring to FIG. 6, circuit block 54 of the RPOTS channel includes two circuit paths 58 and 62. Circuit path 58 provides impedance for telephones in China while parallel circuit path 62 provides impedance for telephones in Germany. Circuit paths 58 and 62 terminate at relays 56 and 60 that select one path for use. Though circuit block 54 includes two circuit paths, a circuit block can include many more to provide compatibility with even more telecommunications standards. Another implementation features "plug-in" circuit blocks where each circuit block supports a different set of telecommunications standards. In this other implementation, a manufacturer or purchaser could simply insert plug-in circuit blocks that correspond to the region for which the card is destined. For example, one circuit block could support different Asian countries while another circuit block could support a number of European countries.

Figure 7:
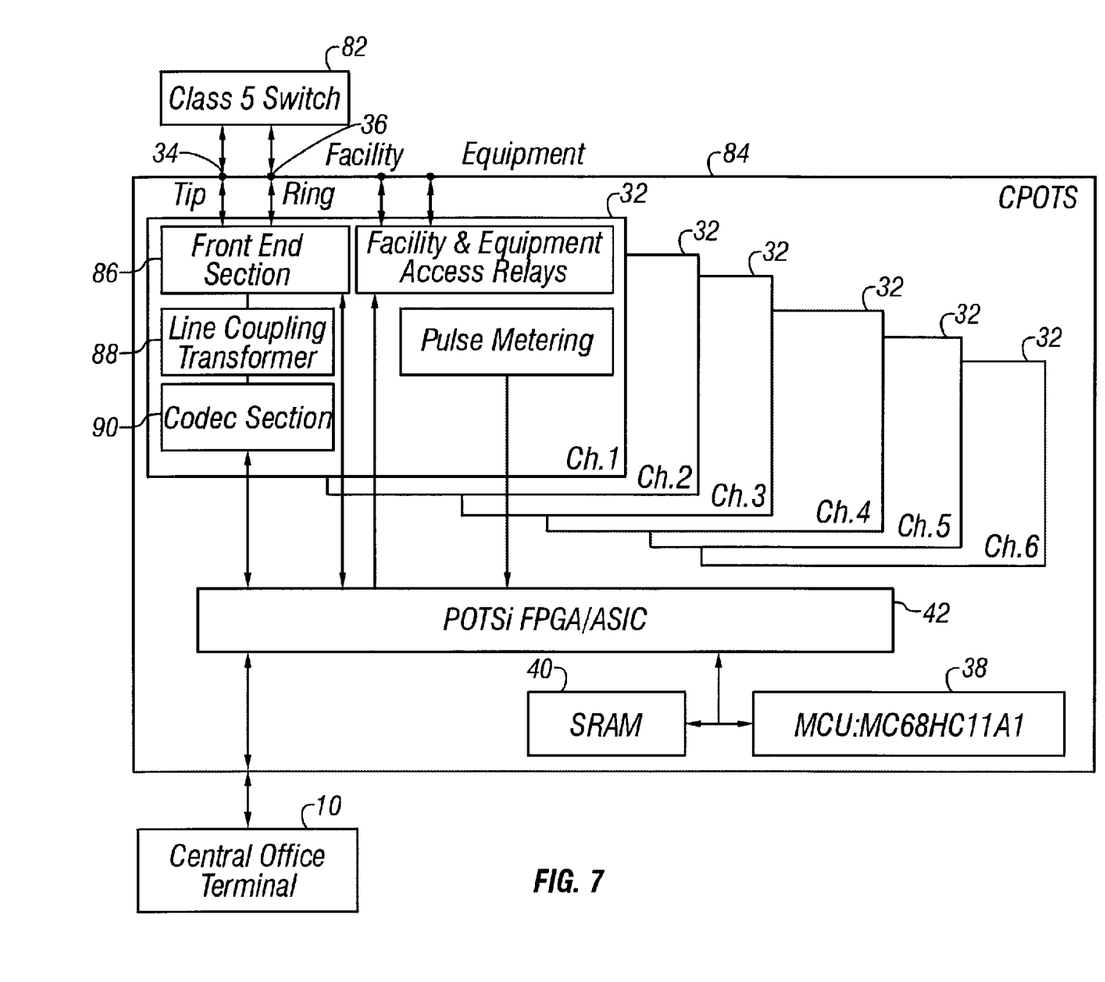
FIG. 7 is a block diagram of a CPOTS (central office terminal POTS) card.

Referring to FIG. 7, in a DLC configuration, a CPOTS card 84 receives signals from the central office terminal 10 and sends them to connected telecommunications equipment such as a class 5 switch 82. The CPOTS card 84 includes many of the same elements as an RPOTS card. However, the CPOTS card 84 shown uses a line coupling transformer 88 instead of a SLIC to process codec section 90 signals. Signals to the switch also must satisfy a country's telecommunication standards.

Figure 8:
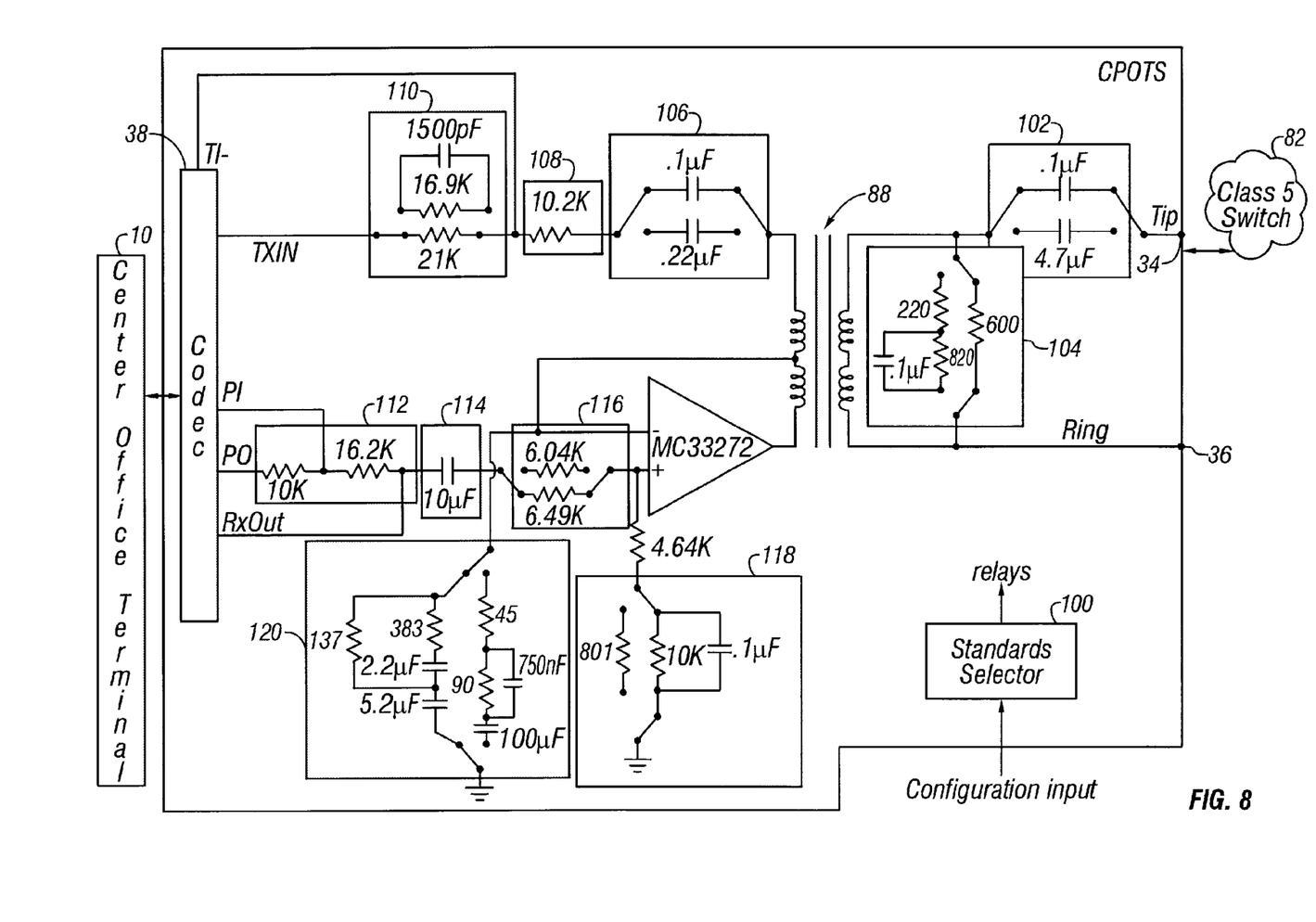
FIG. 8 is a schematic of a programmable CPOTS card.

Referring to FIG. 8, a CPOTS channel 32, like the RPOTS channel discussed in regard to FIG. 5, also includes circuit blocks that provide different circuit paths for different telecommunications standards. The CPOTS channel 32 includes circuit blocks for transmit gain 108, 104, and 110, transmit blocking and frequency response 106, transhybrid balance 102, 120, and 118, and impedance 104. The CPOTS channel also includes a standard selector 100 that adjusts the relays to provide circuit block paths based on configuration input.

Figure 9:
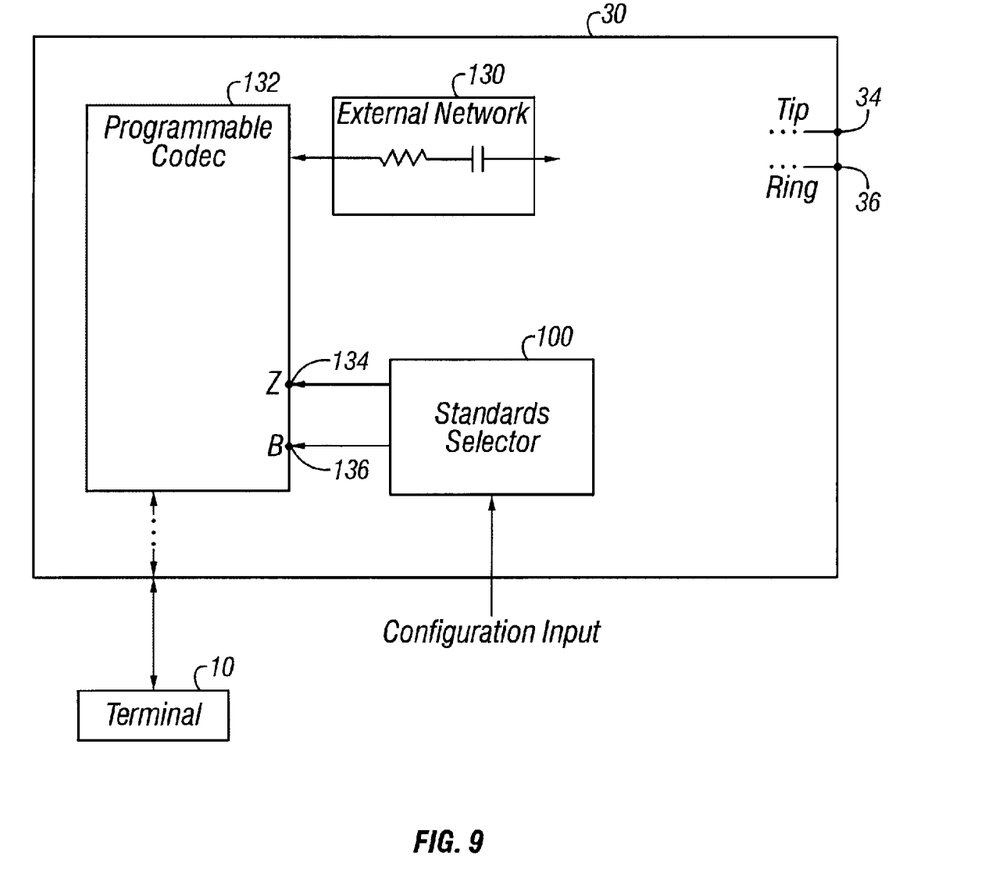
FIG. 9 is a schematic of an RPOTS card that includes a programmable codec.

Referring to FIG. 9, in another implementation, a card channel 30 includes an external network 130, a programmable codec 132 (e.g. AMD AM79Q02), and a standard selector 100. A programmable codec 132 uses fewer circuit board pins than sets of multiple circuit paths and relays. The external network 130 provides a base level of impedance for the channel 30. The programmable codec 120 can adjust impedance based on input to its Z (impedance) selector pins 134. For example, as listed in FIG. 3, Brazil requires greater subscriber line impedance (R1=900) than China (R1=600). If the channel 30 served telephones in Brazil instead of China, the standards selector would send a greater value to the Z selector pins 134.

The programmable codec also can provide transhybrid balance through its B (transhybrid balance) selector pins 136. Depending on the country of deployment, the standards selector 100 sends the appropriate signals to the pins 136 based on configuring input.

In another implementation, the standards selector 100 includes memory (not shown) that stores a table of different standards and the corresponding signals to send to the programmable codec's Z selector 134 and B selector pins 136. A telecommunications terminal administrator can use a connected telecommunications terminal management system (not shown) to issue a message that configures the card channel. The message contains information representing a selected telecommunications standard that the standards selector 110 uses to determine which signals to send the programmable codec.

Other embodiments are within the scope of the following claims.

What is claimed is:

1. A telecommunications card that receives a configuration input for use in a telecommunications terminal, comprising:

a subscriber line connection;

a telecommunications terminal connection; and at lent one programmable channel that carries signals between the subscriber line connection and the telecommunications terminal connection, the programmable channel constructed to alter the channel's electrical characteristics to satisfy different telecommunications standards relating to subscriber lines in response to the configuration input, the programmable channel further comprising an interchangeable plug-in circuit block that includes selectable circuit paths which respectively correspond to different telecommunications standards.

2. The telecommunications card of claim 1 wherein the different telecommunications standards correspond to different countries having different telecommunications standards.

3. The telecommunications card of claim 1 wherein the telecommunications standards comprise subscriber line impedance.

4. The telecommunications card of claim 1 wherein the telecommunications standards comprise subscriber line gain.

5. The telecommunications card of claim 1 wherein the telecommunications standards comprise transhybrid balance.

6. The telecommunications card of claim 1 wherein the subscriber line comprises a POTS subscriber line.

7. The telecommunications card of claim 6 wherein the POTS subscriber line is an RPOTS subscriber line.

8. The telecommunications card of claim 6 wherein the POTS subscriber lines is a CPOTS subscriber line.

9. The telecommunications card of claim 1 wherein the subscriber line comprises an ISDN subscriber line.

10. The telecommunications card of claim 1 wherein the different telecommunications standards comprise the standards of different countries.

11. The telecommunications card of claim 1 wherein the programmable channel further includes a standards selector that selects a selectable circuit path within the interchangeable plug-in circuit block based on the configuration input.

12. The telecommunications card of claim 11 wherein the configuration input comprises input from a dip switch.

13. The telecommunications card of claim 11 wherein the configuration input comprises an electronic signal sent by software.

14. The telecommunications card of claim 1 wherein the channel comprises:
a programmable codec; and
a standards selector connected to the programmable codec that sends programming signals to the codec based on configuring input.

15. The telecommunications card of claim 14 further comprising an external network that provides a base level of impedance.

16. The telecommunications card of claim 15 wherein the external network comprises an interchangeable plug-in external network wherein different external networks provide different base levels of impedance.

17. The telecommunications card of claim 14 wherein the programmable codec adjusts impedance.

18. The telecommunications card of claim 14 wherein the programmable codec adjusts transhybrid balance.

19. A method of changing telecommunications standards for a telecommunications card, the method comprising:
receiving telecommunications standards selection information; and
modifying electrical characteristics of the telecommunications card based on the received selection information, the modifying step including selecting one of a plurality of circuit paths within an interchangeable plug-in circuit block on the telecommunications card, the one circuit path selected based on the received selection information, and the plurality of circuit paths restively corresponding to different telecommunications standards.

20. The method of claim 19 wherein modification of the electrical characteristics comprises
adjusting subscriber line impedance to correspond to the selected telecommunication standard.

21. The method of claim 19 wherein modification of the electrical characteristics comprises
adjusting transhybrid balance to correspond to the selected telecommunications standard.

22. The method of claim 19 wherein modification of the electrical characteristics comprises
positioning relays within the interchangeable plug-in circuit block to correspond to the telecommunications standard identified by the received telecommunications standard selection information.

23. The method of claim 19 wherein modification of the electrical characteristics comprises producing signals that program a programmable codec.

24. The method of claim 23 wherein receiving standards selection information comprises receiving a software message.

* * * * *